(12) United States Patent
Shlens et al.

(10) Patent No.: US 12,340,442 B2
(45) Date of Patent: *Jun. 24, 2025

(54) STYLIZING INPUT IMAGES

(71) Applicant: Google LLC, Mountain View, CA (US)

(72) Inventors: Jonathon Shlens, San Francisco, CA (US); Vincent Dumoulin, Montreal (CA); Manjunath Kudlur Venkatakrishna, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/242,723

(22) Filed: Sep. 6, 2023

(65) Prior Publication Data

US 2023/0410389 A1 Dec. 21, 2023

Related U.S. Application Data

(63) Continuation of application No. 16/681,391, filed on Nov. 12, 2019, now Pat. No. 11,776,167, which is a (Continued)

(51) Int. Cl.
*G06T 11/00* (2006.01)
*G06F 18/214* (2023.01)
(Continued)

(52) U.S. Cl.
CPC .......... *G06T 11/001* (2013.01); *G06F 18/214* (2023.01); *G06F 18/40* (2023.01);
(Continued)

(58) Field of Classification Search
CPC ............................ G06N 3/0464; G06N 3/096
See application file for complete search history.

(56) References Cited

U.S. PATENT DOCUMENTS 5,832,119 A 11/1998 Rhoads
8,625,890 B1 1/2014 Brenner
(Continued)

FOREIGN PATENT DOCUMENTS

| CN | 102741858 A | 10/2012 |
| CN | 102893327 A | 1/2013 |
| CN | 106687995 A | 5/2017 |

OTHER PUBLICATIONS

Ulyanov, Dmitry, et al. "Texture networks: Feed-forward synthesis of textures and stylized images." arXiv preprint arXiv:1603.03417 (2016). (Year: 2016).*

(Continued)

*Primary Examiner* — Eric Nilsson
(74) *Attorney, Agent, or Firm* — Fish & Richardson P.C.

(57) ABSTRACT

A method for applying a style to an input image to generate a stylized image. The method includes maintaining data specifying respective parameter values for each image style in a set of image styles, receiving an input including an input image and data identifying an input style to be applied to the input image to generate a stylized image that is in the input style, determining, from the maintained data, parameter values for the input style, and generating the stylized image by processing the input image using a style transfer neural network that is configured to process the input image to generate the stylized image.

20 Claims, 3 Drawing Sheets

Related U.S. Application Data continuation of application No. 16/380,010, filed on Apr. 10, 2019, now Pat. No. 10,535,164, which is a continuation of application No. PCT/US2017/057657, filed on Oct. 20, 2017.

(60) Provisional application No. 62/411,414, filed on Oct. 21, 2016.

(51) Int. Cl.
*G06F 18/40* (2023.01)
*G06N 3/04* (2023.01)
*G06N 3/0464* (2023.01)
*G06N 3/08* (2023.01)
*G06N 3/096* (2023.01)

(52) U.S. Cl.
CPC .............. *G06N 3/04* (2013.01); *G06N 3/0464* (2023.01); *G06N 3/08* (2013.01); *G06N 3/096* (2023.01); *G06T 11/00* (2013.01)

(56) References Cited

U.S. PATENT DOCUMENTS

| | | |
|---|---|---|
| 9,576,351 B1 | 2/2017 | Barzel et al. |
| 9,922,432 B1 | 3/2018 | Risser |
| 2015/0324686 A1 | 11/2015 | Julian et al. |
| 2019/0236814 A1 | 8/2019 | Shlens et al. |

OTHER PUBLICATIONS

Ulyanov, Dmitry, Andrea Vedaldi, and Victor Lempitsky. "Instance normalization: The missing ingredient for fast stylization." arXiv preprint arXiv:1607.08022 (2016). (Year: 2016).*
Frigo, Oriel, et al. "Split and match: Example-based adaptive patch sampling for unsupervised style transfer." Proceedings of the IEEE conference on computer vision and pattern recognition. 2016. (Year: 2016).*
Reinhard, Erik, et al. "Color transfer between images." IEEE Computer graphics and applications 21.5 (2001): 34-41. (Year: 2001).*
Ruder, Manuel, Alexey Dosovitskiy, and Thomas Brox. "Artistic style transfer for videos." Pattern Recognition: 38th German Conference, GCPR 2016, Hannover, Germany, Sep. 12-15, 2016, Proceedings 38. Springer International Publishing, 2016.(Year: 2016).*
Abadi et al, "Tensorflow: Large-scale machine learning on heterogeneous distributed systems," arXiv, 2016, preprint arXiv:1603.04467.
Deng et al, "Imagenet: A large-scale hierarchical image database," Computer Vision and Pattern Recognition, 2009, pp. 248-255.
Dmitry Ulyanov et al. "Instance Normalization: The Missing Ingredient for Fast Stylization," Jul. 27, 2016, (Jul. 27, 2016).
Dumoulin et al. "A Learned Representation of Artistic Style," ICLR 2017, 26 pages.
Efros & Freeman, "Image quilting for texture synthesis and transfer," Proceedings of the 28th annual conference on Computer graphics and interactive techniques, 1999, pp. 341-346.
Efros et al. "Texture synthesis by non-parametric sampling" In Computer Vision, 1999, The Proceedings of the Seventh IEEE International Conference on, vol. 2, pp. 1033-1038, IEEE 1999.
Elad & Milanfar, "Style-transfer via texture-synthesis," IEEE Transactions on Image Processing, 2017, pp. 2338-2351.
Frigo et al, "Split and match: Example-based adaptive patch sampling for unsupervised style transfer," Proceedings of the IEEE Conference on Computer Vision and Pattern Recognition, 2016, pp. 553-561.
Gatys et al, "A neural algorithm of artistic style," arXiv preprint arXiv:1508.06576, 2015, 16 pages.
Gatys et al, "Preserving color in neural artistic style transfer," arXiv preprint arXiv:1606.05897, 2016, 8 pages.
Gatys et al, "Texture synthesis using convolutional neural Networks," Advances in Neural Information Processing Systems, 2015, pp. 262-270.
Gatys et al. "Image style transfer using convolutional neural networks." Proceedings of the IEEE conference on computer vision and pattern recognition. 2016. (Year: 2016).
Gatys et al. "Controlling perceptual factors in neural style transfer" CoRR, abs/1611.07865, 2016.
Hertzmann et al, "Image analogies," Proceedings of the 28th annual conference on Computer graphics and interactive techniques, 2001, pp. 327-340.
Hu, "The Research and Applications of Several Issues about Internet Visual Media," Dissertation for the Degree of Doctor Philosophy, Hefei University of Technology, Oct. 2014, 103 pages (with English Abstract).
Johnson et al, "Perceptual losses for real-time style transfer and super-resolution," arXiv preprint arXiv:1603.08155, 2016, 18 pages.
Johnson et al. "Perceptual Losses for real-time style transfer and super-resolution," arXiv 1603.08155v1 Mar. 27, 2016, 18 pages.
Julesz, "Visual pattern discrimination," IRE Trans. Info Theory, 1962, pp. 84-92.
Kingma & Ba, "Adam: A method for stochastic optimization," arXiv preprint arXiv:1412.6980, 2014.
Kwatra et al, "Texture optimization for example based Synthesis," ACM Transactions on Graphics (ToG), 2005, 24(3):795-802.
Leon A Gatys et al. "Image Style Transfer Using Convolutional Neural Networks," Jan. 1, 2016, (Jan. 1, 2016) pp. 1-10.
Li & Wand, "Precomputed real-time texture synthesis with markovian generative adversarial networks," European Conference on Computer Vision., 2016, 17 pages.
Lin et al, "Real-time texture synthesis by patch-based sampling," ACM Transactions on Graphics, 2001, 20(3):127-150.
Odena et al, "Deconvolution and Checkerboard Artifacts," Distill, 2016.
Office Action in Chinese Appln. No. 201780065307.1, dated Nov. 30, 2022, 16 pages (with English Translation).
PCT Office: Notification of Transmittal of the International Search Report and Written Opinion mailed in corresponding Patent Application No. PCT/US2017/057657 (Dec. 13, 2017).
Portilla & Simoncelli, "A parametric texture model based on joint statistics of complex wavelet coefficients," International Journal of Computer Vision, 1999, pp. 49-71.
Simoncelli & Olshausen, "Natural image statistics and neural representation," Annual Review of Neuroscience, 2001, pp. 1193-1216.
Simonyan & Zisserman, Very deep convolutional networks for large-scale image recognition. arXiv preprint arXiv:1409.1556, 2016, 14 pages.
Ulyanov et al, "Instance normalization: The missing ingredient for fast stylization," arXiv preprint arXiv:1607.08022, 2016, 6 pages.
Ulyanov et al, "Texture networks: Feedforward synthesis of textures and stylized images," arXiv preprint arXiv:1603.03417, 2016, 9 pages.
Ulyanov et al., "Texture networks: Feed-forward synthesis of textures and stylized images," arXiv, Mar. 10, 2016, 16 pages.
Van den Oord et al "A generative model for raw audio" CoRR, abs/1609.03499, 2016.
Van den Oord et al, "Conditional image generation with pixelcnn decoders," CoRR, abs/1606.05328, 2016, 9 pages.
Wei & Levoy, "Fast texture synthesis using tree-structured vector quantization," Proceedings of the 27th annual conference on Computer graphics and interactive techniques, 2000, pp. 479-488.
Jun et al., "Computer vision and machine learning in 3D human animation: A survey," Journal of Computer-Aided Design & Computer Graphics, Mar. 15, 2008, 10 pages (with English Abstract).
Zeiler & Fergus, "Visualizing and understanding convolutional networks," European Conference on Computer Vision, 2014, pp. 818-833.

* cited by examiner

STYLIZING INPUT IMAGES

CROSS-REFERENCE TO RELATED APPLICATION

This application is a continuation of U.S. application Ser. No. 16/681,391, filed on Nov. 12, 2019, which is a continuation of U.S. application Ser. No. 16/380,010, filed on Apr. 10, 2019, which claims the benefit of International Application No. PCT/US2017/057657, filed on Oct. 20, 2017, which claims priority to U.S. Provisional Application Ser. No. 62/411,414, filed on Oct. 21, 2016. The disclosures of these prior applications are considered part of and are incorporated by reference in the disclosure of this application.

BACKGROUND

This specification relates to applying styles to input images using neural networks.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes systems and methods for applying a style to an input image to generate a stylized image.

One of the methods for applying a style to an input image to generate a stylized image includes: maintaining data specifying respective parameter values for each image style in a set of image styles, receiving an input comprising an input image and data identifying an input style to be applied to the input image to generate a stylized image that is in the input style, determining, from the maintained data, parameter values for the input style, and generating the stylized image by processing the input image using a style transfer neural network that is configured to process the input image to generate the stylized image.

The style transfer neural network includes a conditional instance normalization layer between a first neural network layer and a second neural network layer. The conditional instance normalization layer is configured to, during processing of the input image by the style transfer neural network: receive a first layer output generated by the first neural network layer, transform the first layer output in accordance with current values of conditional instance normalization layer parameters to generate a conditional instance normalization layer output, and provide the conditional instance normalization layer output as an input to the second neural network layer. Generating the stylized image includes setting, for the processing of the input image by the style transfer neural network, the current values of the conditional instance normalization layer parameters to be the parameter values for the input style.

Particular embodiments of the subject matter described in this specification can be implemented so as to realize one or more of the following advantages. The system as described in this specification implements a single, scalable deep style transfer neural network that can capture the style multiple diverse images. Such a neural network generalizes across a diversity of image styles. The system as described in this specification allows users or other systems to arbitrarily combine the styles that the neural network has been trained to apply. The style transfer neural network can effectively be trained to apply multiple different styles to input images because only a small proportion of the parameters of the neural network depend on the style that the neural network is applying to an input image. Thus, the time required to train a neural network to apply multiple different styles to input images is reduced and the amount of computer processing resources required to apply multiple different styles to the same image is also reduced. Such a reduction in processing resources is particularly advantageous when the style transfer neural network is implements in, for example, a mobile device, in which power consumption and processing resource management are particularly important. In addition, an output image can be provided to a user more efficiently i.e. in a shorter amount of time, providing other related advantages such as a reduced screen-on time, with further benefits in terms of the power consumption of the device. In certain embodiments wherein the style transfer neural network is distributed across a large system of such devices, the reduction in processing and power consumption requirements, and a reduction in the network requirements between the devices in the system, can result in large scale efficiencies across the system as a whole.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification generally describes an image style transfer system that can perform style transfer on input images. Style transfer can be defined as generating, from a content image and a style image, a stylized image (i.e., a pastiche image) whose content is similar to that of the content image but whose style is similar to that of the style image. Generally, a content image is an image captured by a camera, while a style image is a painting that has been drawn and painted according to a painting style (i.e., artistic style) or is a digital image that has been edited using one or more image editing techniques. A style of a style image may include one or more of the following: (i) repeated spatial motifs within the style image, for example, visual textures (e.g. field of grass) and painting strokes, (ii) the color palette of the style image, and the placement of stylistic elements including spatial motifs and colors based on the semantics contained in the style image.

Figure 1:
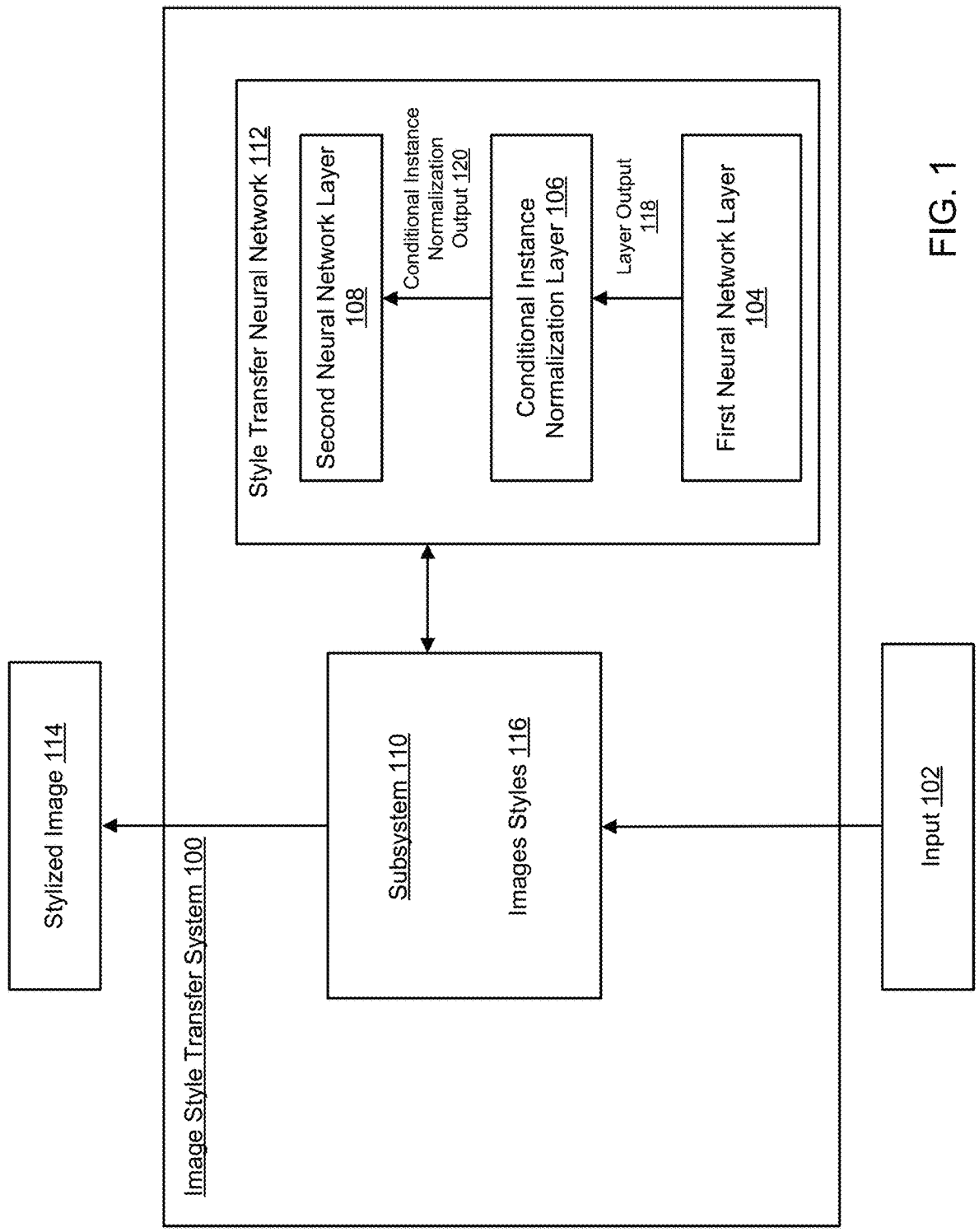
FIG. 1 shows an example image style transfer system.

FIG. 1 shows an example image style transfer system 100. The image style transfer system 100 is an example of a system implemented as computer programs on one or more computers in one or more locations, in which the systems, components, and techniques described below can be implemented. Generally, the image style transfer system 100 is a system that applies a style to an input image to generate a stylized image.

The image style transfer system 100 is configured to receive an input 102 that includes an input image and data identifying an input style and to process the input image to generate a stylized image 114 from the input image that is in the input style, i.e., that has content similar to the input image but has the input style.

In some implementations, the system 100 may present to a user of the system with a user interface that allows the user to select an input style from a set of image styles maintained by the system 100 (i.e., by selecting from style images that are each in a different style) or to select a combination of multiple image styles from the set of image styles, or to specify a weight that should be applied to each image style in the combination of multiple image styles.

To generate the stylized image 114, the image style transfer system 100 includes a subsystem 110 and a style transfer neural network 112.

The subsystem 110 maintains data specifying respective parameter values for each image style in a set of image styles 116. Each image style in the set of image styles 116 is a style in which a particular image or a set of multiple particular images are depicted, e.g., a style with which a painting has been drawn, a style or particular way in which a digital image has been edited, e.g., using raster graphics editing techniques or other image editing techniques, or a particular configuration of camera settings used to capture the particular image or particular images. The respective parameter values for each of the image styles have been determined by training the style transfer neural network 112. An example process for training the style transfer neural network 112 is described in detail below with reference to FIG. 2.

The subsystem 110 is configured to receive the input 102 including the input image and the data identifying the input style to be applied to the input image to generate the stylized image 114 that is in the input style. The subsystem 110 is configured to determine, from the maintained data, the parameter values for the input style based on the data identifying the input style. In particular, the subsystem 110 determines that the input style is a particular image style from the set of image styles, and assigns the parameter values for the particular image style to be the parameter values for the input style.

For example, the subsystem 110 can maintain a table or other appropriate data structure that generally maps each of the image styles with respective parameter values of the image style. Each of the image style has a respective index, e.g., an integer or a string (e.g., the name of the style), that can be used to look up or to retrieve respective values of parameters of the image style from the table or the other appropriate data structure. If the input style is a particular image style from the set of image styles maintained by the subsystem 110, the data identifying the input style can include the respective index of the image style, for example, the name of the image style.

In some implementations, when the input style is a combination of two or more image styles from the set of image styles, the subsystem 110 combines the respective parameter values for the two or more image styles to determine the parameter values for the input style.

In some implementations, when the input 102 specifies a respective weight to be applied to each of the two or more image styles, the subsystem 110 combines the respective parameter values for the two or more image styles by weighting the respective parameter values for each of the two or more image styles by the weight to be applied to the image style in order to determine the parameter values for the input style. In some cases, the subsystem 110 receives a user input that defines the respective weights.

The subsystem 112 is then configured to generate a stylized image 114 in the input style by processing the input image using the style transfer neural network 112. The style transfer neural network 112 is a neural network that is configured to receive an input image and to output a stylized version of the input image.

While many styles may share some degree of computation, conventional approaches often neglect this sharing by training N networks from scratch when building an N-styles style transfer system. For instance, many impressionist paintings share similar paint strokes, but differ in the color palette being used. In that case, it is wasteful to treat a set of N impressionist paintings as completely separate styles. To take this into account, the style transfer neural network 112 includes one or more conditional instance normalization layers and is trained on a diversity of styles, thus enabling the system 100 to generalize across the diversity of styles. The conditional instance normalization layers model a style by determining scaling and shifting parameters after normalization to each specific style. In other words, all convolutional weights (i.e., parameters) of the style transfer neural network 112 can be shared across many styles, and it is sufficient to tune parameters for an affine transformation after normalization for each style.

An example of a style transfer neural network architecture that can be modified to include conditional instance normalization layers is described in Justin Johnson, Alexandre Alahi, and Li Fei-Fei, "*Perceptual losses for real-time style transfer and super-resolution.*" arXiv preprint arXiv: 1603.08155, 2016. For example, the architecture can be modified by replacing some or all of the batch normalization layers with conditional instance normalization layers.

Each of the one or more conditional instance normalization layers in the style transfer neural network 112 is positioned after a respective neural network layer, e.g., a convolutional neural network layer, in the neural network 112. For example, as shown in FIG. 1, the neural network 112 includes a conditional instance normalization layer 106 that is positioned after a first neural network layer 104 and is followed by a second neural network layer 108. The first neural network layer 104 and the second neural network layer 108 are convolutional neural network layers.

To style the input image in the input style, the subsystem 110 sets, for each of the conditional instance normalization layers in the neural network, the current values of the conditional instance normalization layer parameters using the determined parameter values for the input style. The subsystem 110 sets the current values of parameters of the one or more conditional instance normalization layers (e.g., layer 106) without modifying values of parameters of other neural network layers (e.g., layer 104 and layer 108) of the neural network 112. Thus, the subsystem 110 keeps the values of the parameters of the other layers in the neural network the same for all input images, but modifies the values of the parameters for all of the conditional instance normalization layers in accordance with the input style in which the input image is to be styled.

If there is a single conditional instance normalization layer in the neural network, the subsystem 110 sets the current values of the conditional instance normalization layer parameters to be the parameter values for the input style. If there are multiple conditional instance normalization layers in the neural network, the parameter values for the input style include a respective subset corresponding to each of the conditional instance normalization layers and the system sets the current values of the conditional instance normalization layer parameters for each layer to be the corresponding subset of the parameter values for the input style.

The subsystem 110 is then configured to generate the stylized image 114 by processing the input image through each of the neural network layers of the neural network 112 while the current values of the conditional instance normalization layer parameters are set to the determined parameter values for the input style. During the processing of the input image by the neural network 112, each conditional instance normalization layer is configured to receive a layer output generated by the neural network layer before the conditional instance normalization layer and to transform the layer output in accordance with current values of conditional instance normalization layer parameters to generate a conditional instance normalization layer output, and provide the conditional instance normalization layer output as an input to another neural network layer in the neural network. For example, the conditional instance normalization layer 106 is configured to receive a layer output 118 generated by the first neural network layer 104 and to transform the layer output 118 in accordance with current values of parameters of the conditional instance normalization layer 106 to generate a conditional instance normalization layer output 120, and to provide the conditional instance normalization layer output 120 as an input to the second neural network layer 108.

To transform the layer output, the conditional instance normalization layer normalizes the layer output to generate a normalized layer output and transforms the normalized layer output in accordance with the current values of the conditional instance normalization layer parameters to generate the conditional instance normalization layer output.

More specifically, the conditional instance normalization layer normalizes the layer output by, for each depth dimension of the layer output, determining normalization statistics for components of the first layer output across the spatial dimensions of the first layer output, and normalizing the components of the first layer output using the normalization statistics.

The conditional instance normalization layer then transforms the normalized layer output by scaling the normalized layer output in accordance with current values of scaling conditional instance normalization layer parameters to generate a scaled normalized layer output, and by shifting the scaled normalized layer output in accordance with current values of shifting conditional instance normalization layer parameters to generate the conditional instance normalization layer output.

For example, a conditional instance normalization layer output z specific to the input style s may have the following form:

$$z = \gamma_s \left( \frac{x - \mu}{\sigma} \right) + \beta_s,$$

where x is the layer output generated by the neural network layer before the conditional instance normalization layer, and $\mu$ is x's mean and $\sigma$ is x's standard deviation taken across spatial axes of the layer output x. $\gamma_s$ and $\beta_s$ are the identified parameter values for the input style s, which are set as the current values of parameters of the conditional instance normalization layer. $\gamma_s$ and $\beta_s$ are also called scaling and shifting parameters, respectively.

The conditional instance normalization layer output is then provided as input to the next neural network layer for processing. The process continues until the neural network has processed the input image through all layers of the neural network to generate the stylized image.

By incorporating conditional instance normalization layers, the style transfer neural network 112 provides numerous technical advantages over prior approaches. For example, conditional instance normalization allows the system 100 to stylize a single input image into multiple styles, e.g., N styles, with a single feed forward pass of the network 112 with a batch size of N instead of requiring N feed forward passes to perform N style transfers as other single-style networks. In addition, because conditional instance normalization layers only act on the scaling and shifting parameters $\gamma$ and $\beta$, training the style transfer neural network 112 on N styles requires fewer parameters than the prior approaches of training N separate networks. In fact, because the size of $\gamma$ and $\beta$ grows linearly with respect to the number of feature maps in the style transfer neural network 112, the conditional instance normalization approach requires O(N×L) parameters, where L is the total number of feature maps in the style transfer neural network 112.

In some implementations, the input 102 may identify a video that includes multiple video frames, and the input image is a video frame from the video. In these implementations, the system 100 can be configured to generate a respective stylized image for each of the multiple video frames in the video by applying the input style to each of the multiple video frames using the style transfer neural network 112 in the same manner as described above, but the style transfer neural network 112 has been additionally trained to guarantee that stylized images for the multiple video frames in the video have similar stylizations.

After generating the stylized image 114 for the input image or multiple stylized images for multiple video frames in the video, the system 100 may provide the stylized image 114 or the multiple stylized images for presentation on a user device. In some cases, the user device is a mobile device, and in these cases, the style transfer neural network 112 is implemented on the mobile device. The neural network 112 is more suited for being implemented on the mobile device because it has fewer parameters and therefore requires fewer computational resources than conventional style transfer networks.

Figure 2:
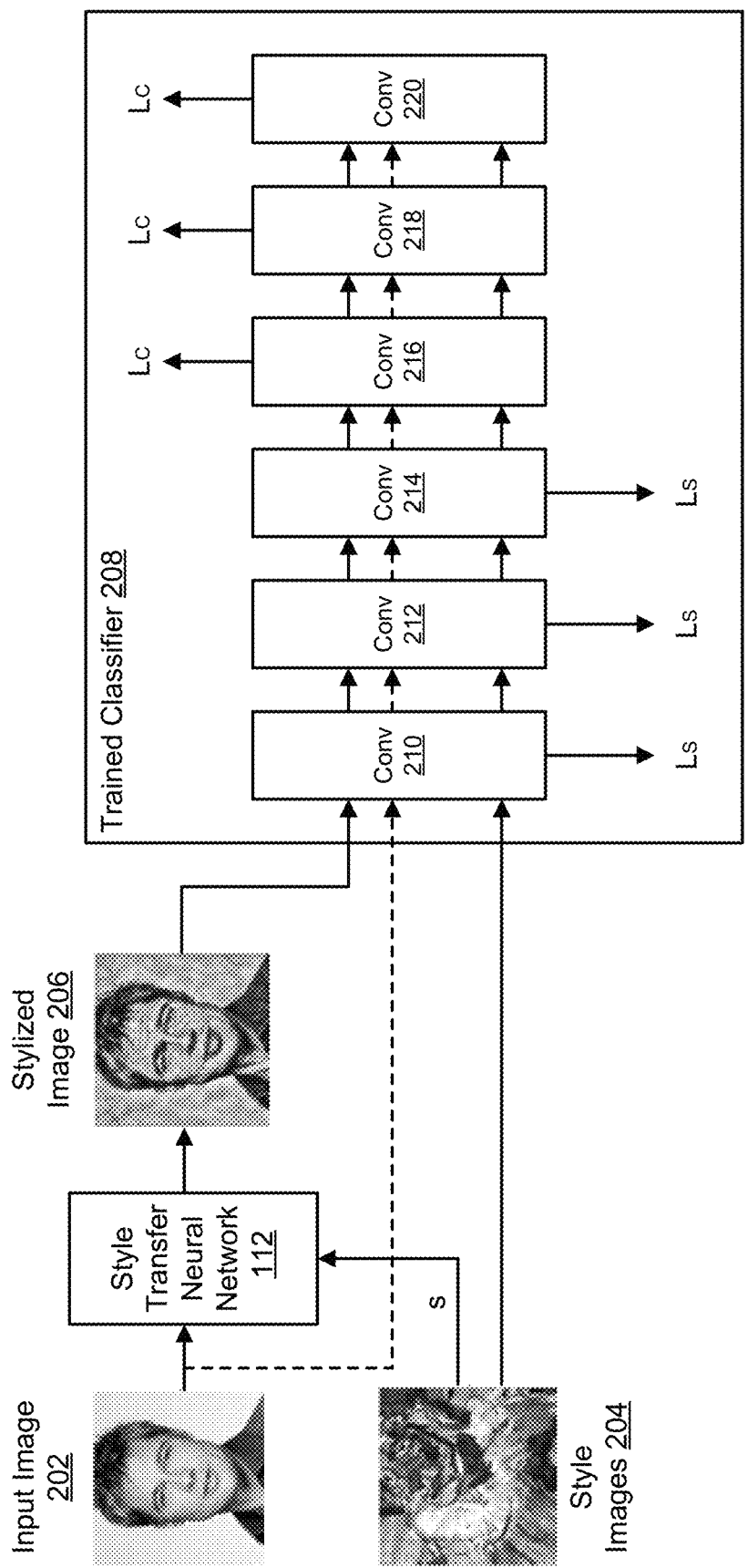
FIG. 2 is an example training diagram for training a style transfer neural network.

FIG. 2 is an example diagram for training a style transfer neural network, e.g., the style transfer neural network 112 of FIG. 1. For convenience, the training of the style transfer neural network will be described as being performed by a system of one or more computers located in one or more locations or by a subsystem of the system. For example, an image style transfer system (e.g., the image style transfer system 100 of FIG. 1) or a subsystem of the image style transfer system (e.g., the subsystem 110 of FIG. 1), appropriately programmed, can perform the training.

The system provides an input image 202 and one or more style images 204 to the style transfer neural network 112. For each of the style images 204, the style transfer neural network 112 can identify a corresponding index s for the style with which the style image is depicted.

For each style image having an index s, the style transfer neural network 112 maintains a set of scaling and shifting conditional instance normalization layer parameters ($\gamma_s$, $\beta_s$)

as training parameters. For each image style, the style transfer neural network 112 generates a stylized image 206 from the input image 202 and the index s corresponding to the image style. The system then provides the input image 202, the stylized image 206, and the style image as input to a trained classifier 208. The trained classifier 208 includes multiple convolutional neural network layers, e.g. convolutional neural network layers 210-220. The trained classifier 208 may have been trained to perform any of a variety of conventional image processing tasks, e.g., image classification, object detection, and so on, using conventional training techniques.

The trained classifier 208 is configured to process the input through each convolutional neural network layer to generate intermediate representations of the input. The system uses the resulting intermediate representations to compute a content loss $L_c$ and style loss $L_s$. In particular, the content loss $L_c$ represents a level of similarity between the content of the input image 202 and the content of the stylized image 206. Two images are similar in content if their high-level features as extracted by the trained classifier 208 are close in Euclidian distance. The content loss $L_c$ is computed using the first several intermediate representations generated by the trained classifier 208, e.g., the intermediate representations generated by convolutional neural network layers 210-214. The style loss $L_S$ represents a level of similarity between the style of the input image 202 and the style of the style image. Two images are similar in style if their low-level features as extracted by the trained classifier 208 share the same statistics or, more concretely, if the difference between the features' Gram matrices has a small Frobenius norm. The style loss $L_s$ is computed using later intermediate representations generated by the trained classifier 208, e.g., the intermediate representations generated by convolutional neural network layers 216-220.

The system then uses the content loss $L_c$ and the style loss $L_S$ to form a training objective function as follows:

$$L(s, c) = \lambda_s L_s(T(c, s)) + \lambda_c L_c(T(c, s)),$$

where $\lambda_s$ and $\lambda_c$ are the weighted coefficients of the style loss $L_s$ and the content loss $L_c$, and T(c, s) is the stylized image 206 generated by the style transfer neural network 112 using the input image c (202) and the image style s.

The system trains the style transfer neural network 112 to minimize the training objective function using a standard training method, e.g., a gradient descent method. For each image style s, the system stores the respective set of trained parameters ($\gamma_s$, $\beta_s$), e.g., in a table or other appropriate data structure, which is maintained, e.g., by the subsystem 110 of FIG. 1, for future uses during execution, e.g., for determining respective values of parameters for a given input style.

Since parameters in the style transfer neural network 112 are shared among styles, the system can incorporate a new style s' to the trained network 112 by keeping the trained parameters fixed and learning a new set of parameters ($\gamma_{s'}$, $\beta_{s'}$). Thus, the system can process multiple styles simultaneously without growing the number of other training parameters, resulting in faster training time and reduced storage space and system complexity.

Figure 3:
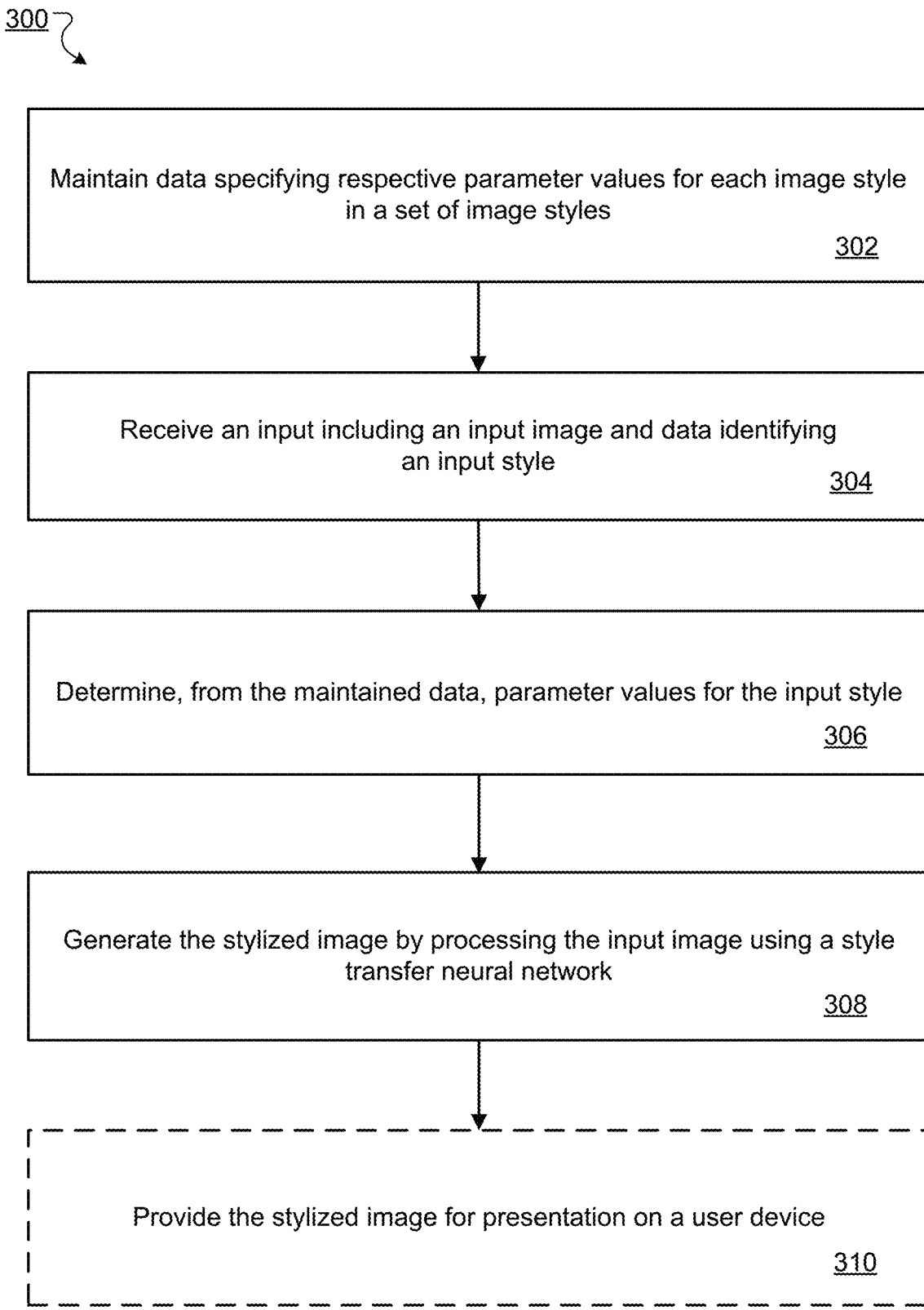
FIG. 3 is a flow diagram of an example process for generating a stylized image from an input image and an input style.

FIG. 3 is a flow diagram of an example process 300 for generating a stylized image from an input image and an input style. For convenience, the process 300 will be described as being performed by a system of one or more computers located in one or more locations or by a subsystem of the system. For example, an image style transfer system (e.g., the image style transfer system 100 of FIG. 1) or a subsystem of the image style transfer system (e.g., the subsystem 110 of FIG. 1), appropriately programmed, can perform the process 300.

The system maintains data specifying respective parameter values for each image style in a set of image styles (step 302).

Each image style in the set of image styles is a style in which a particular image or a set of multiple particular images are depicted, e.g., a style with which a painting has been drawn, a style or particular way in which a digital image has been edited, e.g., using raster graphics editing techniques or other image editing techniques, or a particular configuration of camera settings used to capture the particular image or particular images. The respective parameter values for each of the image styles have been determined by training a style transfer neural network.

The system receives an input including an input image and data identifying an input style to be applied to the input image to generate a stylized image that is in the input style (step 304). In some implementations, the system may receive, through a user interface, a user input identifying a particular input style. In some implementations, the input style is a combination of two or more image styles from the set of image styles. In these implementations, the input may specify a respective weight to be applied to each of the two or more image styles. In some cases, the system may receive a user input that defines the respective weights.

The system determines, from the maintained data, parameter values for the input style (step 306).

In particular, the system determines that the input style is a particular image style from the set of image styles, and assigns the parameter values for the particular image style to be the parameter values for the input style.

In some implementations, when the input style is a combination of two or more image styles from the set of image styles, the system combines the respective parameter values for the two or more image styles to determine the parameter values for the input style. When the input specifies a respective weight to be applied to each of the two or more image styles, the system combines the respective parameter values for the two or more image styles by weighting the respective parameter values for each of the two or more image styles by the weight to be applied to the image style in order to determine the parameter values for the input style.

The system generates the stylized image by processing the input image using the style transfer neural network that is configured to process the input image to generate the stylized image (step 308).

The style transfer neural network includes one or more conditional instance normalization layers. Each of the one or more conditional instance normalization layers in the style transfer neural network is positioned after a respective neural network layer, e.g., a convolutional neural network layer, in the neural network.

To style the input image in the input style, the system sets, for each of the conditional instance normalization layers in the neural network, the current values of the conditional instance normalization layer parameters using the determined parameter values for the input style. The system sets the current values of parameters of the one or more conditional instance normalization layers without modifying values of parameters of other neural network layers of the neural network.

If there is a single conditional instance normalization layer in the neural network, the system sets the current values of the conditional instance normalization layer parameters to be the parameter values for the input style. If there are multiple conditional instance normalization layers in the neural network, the parameter values for the input style include a respective subset corresponding to each of the conditional instance normalization layers and the system sets the current values of the conditional instance normalization layer parameters for each layer to be the corresponding subset of the parameter values for the input style.

The style transfer neural network is then configured to generate the stylized image by processing the input image through each of the neural network layers of the neural network while the current values of the conditional instance normalization layer parameters are set to the determined parameter values for the input style.

During the processing of the input image by the neural network, each conditional instance normalization layer is configured to receive a layer output generated by the neural network layer before the conditional instance normalization layer and to transform the layer output in accordance with current values of conditional instance normalization layer parameters to generate a conditional instance normalization layer output, and provide the conditional instance normalization layer output as an input to another neural network layer in the neural network.

To transform the layer output, the conditional instance normalization layer normalizes the layer output to generate a normalized layer output and transforms the normalized layer output in accordance with the current values of the conditional instance normalization layer parameters to generate the conditional instance normalization layer output.

More specifically, the conditional instance normalization layer normalizes the layer output by, for each depth dimension of the layer output, determining normalization statistics for components of the first layer output across the spatial dimensions of the first layer output, and normalizing the components of the first layer output using the normalization statistics.

The conditional instance normalization layer then transforms the normalized layer output by scaling the normalized layer output in accordance with current values of scaling conditional instance normalization layer parameters to generate a scaled normalized layer output, and shifting the scaled normalized layer output in accordance with current values of shifting conditional instance normalization layer parameters to generate the conditional instance normalization layer output. The conditional instance normalization layer output is then provided as input to the next neural network layer for processing. The process continues until the neural network has processed the input image through all layers of the neural network to generate the stylized image.

In some implementations, the input may identify a video that includes multiple video frames, and the input image is a video frame from the video. In these implementations, the system can be configured to generate a respective stylized image for each of the multiple video frames in the video by applying the input style to each of the multiple video frames using the style transfer neural network in the same manner as described above, but the style transfer neural network has been additionally trained to guarantee that stylized images for the multiple video frames in the video have similar stylizations. For example, the system can modify the objective function described above with reference to FIG. 2, i.e. by adding a constraint to the objective function to guarantee that stylized images for the multiple video frames in the video have similar stylizations, and the style transfer neural network can be trained to minimize the modified objective function.

After generating the stylized image for the input image or multiple stylized images for multiple video frames in the video, the system can optionally provide the stylized image or the multiple stylized images for presentation on a user device (step 310). In some cases, the user device is a mobile device, and in these cases, the style transfer neural network is implemented on the mobile device.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for processing an input image to generate a stylized image using a style transfer neural network, the style transfer neural network comprising a particular neural network layer between a first neural network layer and a second neural network layer, the method comprising:
receiving, by a computing system, an input comprising an input image and input style data, the input style data identifying at least one image style to be applied to the input image to generate a stylized image that is in an input style;
obtaining, by the computing system, parameter values for the input style;
setting current values of parameters of the particular neural network layer to be the obtained parameter values for the input style without modifying current values of parameters of the first neural network layer and the second neural network layer; and
processing the input image, using the style transfer neural network having the current values of parameters of the particular neural network layer set to be the obtained parameter values for the input style and the current values of parameters of the first neural network layer and the second neural network layer unchanged, to generate the stylized image,
wherein a particular neural network output of the particular neural network layer is provided as input to the second neural network layer and a second layer output of the second neural network layer is processed to generate the stylized image.

2. The method of claim 1, further comprising:
providing, by the computing system, the stylized image for presentation to a user.

3. The method of claim 1, wherein the computing device is a mobile device, and wherein the style transfer neural network is implemented on the mobile device.

4. The method of claim 1, wherein the particular neural network layer is configured to, during processing of the input image by the style transfer neural network: receive a first layer output generated by the first neural network layer, normalize the first layer output to generate a normalized layer output; and transform the normalized layer output in accordance with the current values of parameters of the particular neural network layer to generate the particular neural network layer output, and provide the particular neural network layer output as an input to the second neural network layer, wherein normalizing the first layer output to generate the normalized layer output comprises, for each depth dimension of the first layer output:
determining normalization statistics for components of the first layer output across spatial dimensions of the first layer output; and
normalizing the components of the first layer output using the normalization statistics.

5. The method of claim 4, wherein transforming the normalized layer output comprises:
scaling the normalized layer output in accordance with current values of scaling particular neural network layer parameters to generate a scaled normalized layer output; and
shifting the scaled normalized layer output in accordance with current values of shifting particular neural network layer parameters to generate the particular neural network layer output.

6. The method of claim 1, wherein obtaining parameter values for the input style comprises:
determining that the input style data identifies a single image style from a set of image styles, wherein each image style in the set of image styles is mapped to respective parameter values of the image style; and
assigning the parameter values for the single image style to be the parameter values for the input style.

7. The method of claim 6, wherein receiving the input comprises:
receiving a user input identifying the single image style.

8. The method of claim 1, wherein the input style data identifies a combination of two or more image styles from a set of image styles, and wherein determining parameter values for the input style comprises:
combining respective parameter values for the two or more image styles to determine the parameter values for the input style, wherein combining the respective parameter values comprises weighting the respective parameter values for each of the two or more image styles by the weight to be applied to the image style.

9. The method of claim 8, wherein receiving the input comprises:
receiving a user input defining the respective weights.

10. The method of claim 1, further comprising: maintaining, by the computing system, data that maps each image style in a set of image styles to respective parameter values of the image style, wherein the respective parameter values for each image style have been determined by training the style transfer neural network.

11. The method of claim 1, wherein the input identifies a video that comprises a plurality of video frames, and wherein the input image is a video frame from the video.

12. The method of claim 11, wherein a respective stylized image is generated for each of the plurality of video frames in the video by applying the input style to each of the plurality of video frames.

13. The method of claim 12, wherein the style transfer neural network has been trained to guarantee that stylized images for the plurality of video frames in the video have similar stylizations.

14. One or more non-transitory computer-readable storage media storing instructions that, when executed by one or more computers, cause the one or more computers to perform operations for processing an input image to generate a stylized image using a style transfer neural network, the style transfer neural network comprising a particular neural network layer between a first neural network layer and a second neural network layer, the operations comprising:
receiving an input comprising an input image and input style data, the input style data identifying at least one image style to be applied to the input image to generate a stylized image that is in an input style;
obtaining parameter values for the input style;
setting current values of parameters of the particular neural network layer to be the obtained parameter values for the input style without modifying current values of parameters of the first neural network layer and the second neural network layer; and
processing the input image, using the style transfer neural network having the current values of parameters of the particular neural network layer set to be the obtained parameter values for the input style and the current values of parameters of the first neural network layer and the second neural network layer unchanged, to generate the stylized image, wherein a particular neural network output of the particular neural network layer is provided as input to the second neural network layer and a second layer output of the second neural network layer is processed to generate the stylized image.

15. A system implemented by one or more computers, the system comprising:
a style transfer neural network that is configured to process an input image to generate a stylized image from the input image,
wherein the style transfer neural network comprises a particular neural network layer between a first neural network layer and a second neural network layer; and
a subsystem configured to perform operations comprising:
receiving an input comprising an input image and input style data, the input style data identifying at least one image style to be applied to the input image to generate a stylized image that is in an input style;
obtaining parameter values for the input style;
setting current values of parameters of the particular neural network layer to be the obtained parameter values for the input style without modifying current values of parameters of the first neural network layer and the second neural network layer; and
processing the input image, using the style transfer neural network having the current values of parameters of the particular neural network layer set to be the obtained parameter values for the input style and the current values of parameters of the first neural network layer and the second neural network layer unchanged, to generate the stylized image, wherein a particular neural network output of the particular neural network layer is provided as input to the second neural network layer and a second layer output of the second neural network layer is processed to generate the stylized image.

16. The system of claim 15, wherein the operations further comprising:
providing the stylized image for presentation on a mobile device, and wherein the style transfer neural network is implemented on the mobile device.

17. The system of claim 15, wherein the particular neural network layer is configured to, during processing of the input image: receive a first layer output generated by the first neural network layer, normalize the first layer output to generate a normalized layer output; and transform the normalized layer output in accordance with the current values of parameters of the particular neural network layer to generate the particular neural network layer output, and provide the particular neural network layer output as an input to the second neural network layer,
wherein normalizing the first layer output to generate the normalized layer output comprises, for each depth dimension of the first layer output:
determining normalization statistics for components of the first layer output across the spatial dimensions of the first layer output; and
normalizing the components of the first layer output using the normalization statistics.

18. The system of claim 17, wherein transforming the normalized layer output comprises:
scaling the normalized layer output in accordance with current values of scaling particular neural network layer parameters to generate a scaled normalized layer output; and
shifting the scaled normalized layer output in accordance with current values of shifting particular neural network layer parameters to generate the particular neural network layer output.

19. The system of claim 15, wherein obtaining parameter values for the input style comprises:
determining that the input style data identifies a single image style from a set of image styles, wherein each image style in the set of image styles is mapped to respective parameter values of the image style; and
assigning the parameter values for the single image style to be the parameter values for the input style.

20. The system of claim 15, wherein the input style data identifies a combination of two or more image styles from a set of image styles, and wherein determining parameter values for the input style based on the respective parameter values mapped to the one or more image styles identified by the input style data comprises:
combining respective parameter values for the two or more image styles to determine the parameter values for the input style, wherein combining the respective parameter values comprises weighting the respective parameter values for each of the two or more image styles by the weight to be applied to the image style.

* * * * *